(12) United States Patent
Dellow

(10) Patent No.: US 6,865,623 B2
(45) Date of Patent: Mar. 8, 2005

(54) SEMICONDUCTOR INTEGRATED CIRCUIT FOR USE IN DIRECT MEMORY ACCESS

(75) Inventor: Andrew Dellow, Gloucester (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 10/354,908

(22) Filed: Jan. 30, 2003

(65) Prior Publication Data

US 2003/0185067 A1 Oct. 2, 2003

(30) Foreign Application Priority Data

Jan. 30, 2002 (EP) ............................................ 02250645

(51) Int. Cl.[7] .............................................. G06F 13/28
(52) U.S. Cl. ......................................... 710/22; 710/28
(58) Field of Search ..................................... 710/22–28

(56) References Cited

U.S. PATENT DOCUMENTS

| | | | | |
|---|---|---|---|---|
| 5,457,802 A | * | 10/1995 | Catherwood et al. | ....... 713/320 |
| 5,657,288 A | * | 8/1997 | Dent | ..................... 365/230.02 |
| 5,668,815 A | | 9/1997 | Gittinger et al. | ........... 371/21.2 |
| 5,903,912 A | * | 5/1999 | Hansen | ....................... 711/154 |
| 6,044,412 A | * | 3/2000 | Evoy | ............................ 710/14 |
| 6,047,349 A | * | 4/2000 | Klein | ......................... 710/315 |
| 6,330,246 B1 | | 12/2001 | Denning et al. | ............ 370/438 |
| 2001/0042147 A1 | * | 11/2001 | Adams et al. | .............. 710/100 |

FOREIGN PATENT DOCUMENTS

EP          0901081          3/1999     ............ G06F/13/42

* cited by examiner

*Primary Examiner*—Jeffrey Gaffin
*Assistant Examiner*—David Martinez
(74) *Attorney, Agent, or Firm*—Lisa K. Jorgenson; Allen, Dyer, Doppelt, Milbrath & Gilchrist, P.A.

(57) ABSTRACT

A semiconductor integrated circuit for use in direct memory access (DMA) has two sources which communicate with a bus through a bus interface. A DMA access signal generator is coupled to the bus interface and asserts a DMA access output signal at a DMA access signal pin whenever either of the sources requires a DMA access. The need for separate DMA access signal pins for each of the two sources is thereby avoided. With targets on two separate integrated circuits, a single DMA access pin can be used for the two targets, while chip select signals at chip select pins on the source integrated circuit indicate which of the two targets is intended for the DMA access.

23 Claims, 6 Drawing Sheets

SEMICONDUCTOR INTEGRATED CIRCUIT FOR USE IN DIRECT MEMORY ACCESS

FIELD OF THE INVENTION

The present invention relates to a semiconductor integrated circuit for use in a direct memory access (DMA).

BACKGROUND OF THE INVENTION

When a data source on an integrated circuit requires access to write to a target memory, it will normally instruct the processor via an initiator on a word-by-word basis. A source may be a block of memory, and the initiator is the logic which specifies the access required for that memory. The instruction to write to the memory contains the memory address to which the data word is to be written, and the word is then written to that memory location. Then, the next word is taken and a new instruction specifies the next memory location, and the next data word is written to its respective location. This continues until all the data has been written to memory.

With a large block of data to be written, this is a slow process. When a block of data has to be written to a contiguous section of memory, a direct memory access (DMA) can be used. For this, the instruction specifies only the location of the first word to be written, and subsequent data words can be simply streamed to successive subsequent locations in memory. This is much quicker than the normal method of writing the data word-by-word. However, it requires the data source to indicate to the memory that DMA is being used. Even if the address is included in every subsequent word, a target memory can place all DMA accesses in a special buffer separate from other data on the same part. This allows more efficient transfers to the memory. If the source is on one integrated circuit device (chip) and the target on another, then a pin is required to convey a DMA access signal from the source to the target. A source may be a processor or memory and an initiator is usually provided to initiate access from the source. The terms initiator and source are used equally to describe what may be the same components.

If two initiators are present on the source chip and both require direct memory access to a memory on another chip, then two DMA access pins are required on the chip to convey a respective DMA access signal from the respective source to the memory. In general, a DMA access pin is required for each initiator combination, so if there are two sources on the source chip and two target memories on the memory chip then two DMA access pins are required on the source chip.

This is illustrated in FIG. 1 which shows a prior art DMA system in which two initiators on a source chip 110 can access two memories on a target chip 112. The source chip 110 has a first initiator A 114 and a second initiator B 116. Two initiators are shown for simplicity, but there may often be more than two, and six would not be uncommon. Each initiator has a data and address bus output 118. A bus interface 120 is also provided on the source chip 110 and has a bus input 122 and a bus output 124. A data and address bus 126 connects the data and address output 118 of the first source 114, the data and address bus output 118 on the second source 116, and the bus input 122 of the bus interface 120. Bus output pins 128 are provided on the chip 110 for external connection to the target chip 112. The bus output pins 128 are coupled to the bus output 124 of the bus interface 120 by a bus 130.

The target chip 112 has bus input pins 132 connected by external connections 131 to the bus output pins 128 on the source chip 110. The bus input pins 132 are connected by a bus 134 to the input 136 of a bus interface 138. The bus output 140 of the bus interface 138 is coupled to a bus 142 which is connected to the inputs 144 of each of two targets, namely a destination X 146 and a destination Y 148.

The target is a port which is coupled to a random access memory (RAM) which may be on the target chip 112 or may be external to it. The target provides a port or channel to the memory and the target port and the memory itself together form a memory circuit. The target may comprise an interface to an external microprocessor, and may include a read-ahead buffer. The bus interfaces 120,138 are described for convenience as having inputs and outputs since they are used in that sense during a DMA write access, though in fact their ports may be bidirectional.

When normal write operations are required, the selected initiator 114 or 116 provides the data and memory address location over the bus 126 to the bus interface 120. This is conveyed by bus 130, pins 128, external connections 131, pins 132, and bus 134 to the bus interface 138. The bus interface 138 then conveys the data and address onto the bus 142 and to the appropriate target 146,148. The associated memory is then written with the data in accordance with the address instruction. This is then repeated for subsequent data words to be written to the memory.

For DMA access from the sources 114,116 to the targets 146,148, it is necessary for the sources to indicate to the required target that a DMA access is to take place. Thus the initiator 114 has a first DMA access output 150 onto which a DMA access signal is applied when a DMA access is required to target 146. The output 150 is coupled by a line 152 to a pin 154 on the chip 110. The pin 154 is connected by an external connection 156 to a pin 158 on the chip 112 which is connected by a line 160 to a DMA access signal input 162 on the destination 146. When the source 114 requires DMA access to the target 146, the output 150 is asserted and a signal is applied to the target 146 to tell it to expect direct memory access to take place.

Initiator 114 similarly has a DMA access signal connection to the target 148. This is similar to the connection already described, and includes a second DMA access output 164 on initiator 114, a second pin 166 on the chip 110, a second pin 168 on the chip 112, and a DMA access signal input 170 on the second destination 148. The second initiator 116 is similarly connected to the targets 146 and 148. The second initiator 116 has an output 172 connected to a pin 174 on chip 110, in turn connected to a pin 176 on chip 112 connected to an input 178 on destination 146. The second source 116 also has an output 180 connected to a pin 182 on the source chip 110, in turn connected to a pin 184 on the target chip 112 connected to an input 186 on target 148.

With this prior art arrangement a total of two DMA access signal pins 154 and 182 are required on the source chip 110.

A second prior art DMA system is shown in FIG. 1A. For simplicity, only those parts relevant to a DMA access are shown and like components are given the same reference numerals as before. Two initiators requiring DMA access, initiator A 114 and initiator B 116 are present on the source chip 110 and have respective DMA access outputs 150, 180 to indicate when DMA access is required. An OR gate 600 receives these two outputs and provides a DMA access signal to DMA pin 154 which thereby indicates that DMA access is required either by initiator A or initiator B to the destination X 146 on the target chip 112. This is via DMA input pin 158 and input 162 on the target chip 112.

While this proposal reduces the number of pins required on the source device, it is only applicable to the case of a single DMA, it is only applicable to the case of a single DMA channel in the target chip 112 and two DMA initiators in the source chip 110. If three initiators are present on the source device, then three pins would be required.

A third previously proposed DMA system is shown in FIG. 1B. Again, only those components relevant to DMA access are shown and the same reference numerals are used as before. In this example, there are three initiators requiring DMA access labelled initiator A 114, initiator B 116 and initiator C 117, on the source chip 110, each having a respective DMA output 150, 180, 181. The output of initiator A connects to pin 154, the output of initiator B to pin 182 and the output of initiator C to pin 183. Now, as each initiator may require DMA access to either of the destinations X 146 or Y 148, external connections 157 are provided to a pair of OR gates 602, 604.

Each DMA pin 154, 182, 183 is connected by the external connections 157 to each OR gate 602, 604 so that each OR gate has three inputs. The output of the first OR gate 602 is asserted to DMA input pin 602 when any of the initiators 150, 180, 181 require DMA access to destination X 146. Similarly, the output of the second OR gate 604 is asserted to DMA input pin 169 when any of the initiators 150, 180, 181 require DMA access to destination Y 148. As can be seen, this arrangement requires a total of five pins; three on the source chip 110 and two on the destination 112. Other possibilities include placing the OR gates on the source device 112 thereby reducing the number of output pins required to two.

SUMMARY OF THE INVENTION

In view of the foregoing background, an object of the present invention is to reduce the number of pins provided for DMA access signals.

An embodiment of the invention is described below with reference to the drawings. In these embodiments, a semiconductor integrated circuit for use in direct memory access has three sources which communicate with a bus through a bus interface. A DMA access signal generator is coupled to the bus interface and asserts a DMA access output signal at a DMA access signal pin whenever any of the sources requires a DMA access. The need for a separate DMA access signal pins for each of the three sources is thereby avoided. In general only as many DMA access pins as destinations on any given target device are required. This is achieved by conducting multiple comparisons within the DMA access generator producing one or more relationships between initiators and DMA pins.

A particularly advantageous embodiment is used with targets on two or more separate target integrated circuits. A single DMA access pin can then be used for each destination on a target. Chip select signals at chip select pins on the source integrated circuit indicate which of the targets the DMA access is intended for.

BRIEF DESCRIPTION OF THE DRAWINGS

The invention will now be described in more detail by way of example with reference to the accompanying drawings, in which.

DETAILED DESCRIPTION OF THE PREFERRED EMBODIMENTS

Direct memory access arrangements embodying the invention will now be described with reference to FIGS. 3 and 4. The embodiment of FIG. 3 includes five targets on three separate target chips.

Figure 1:
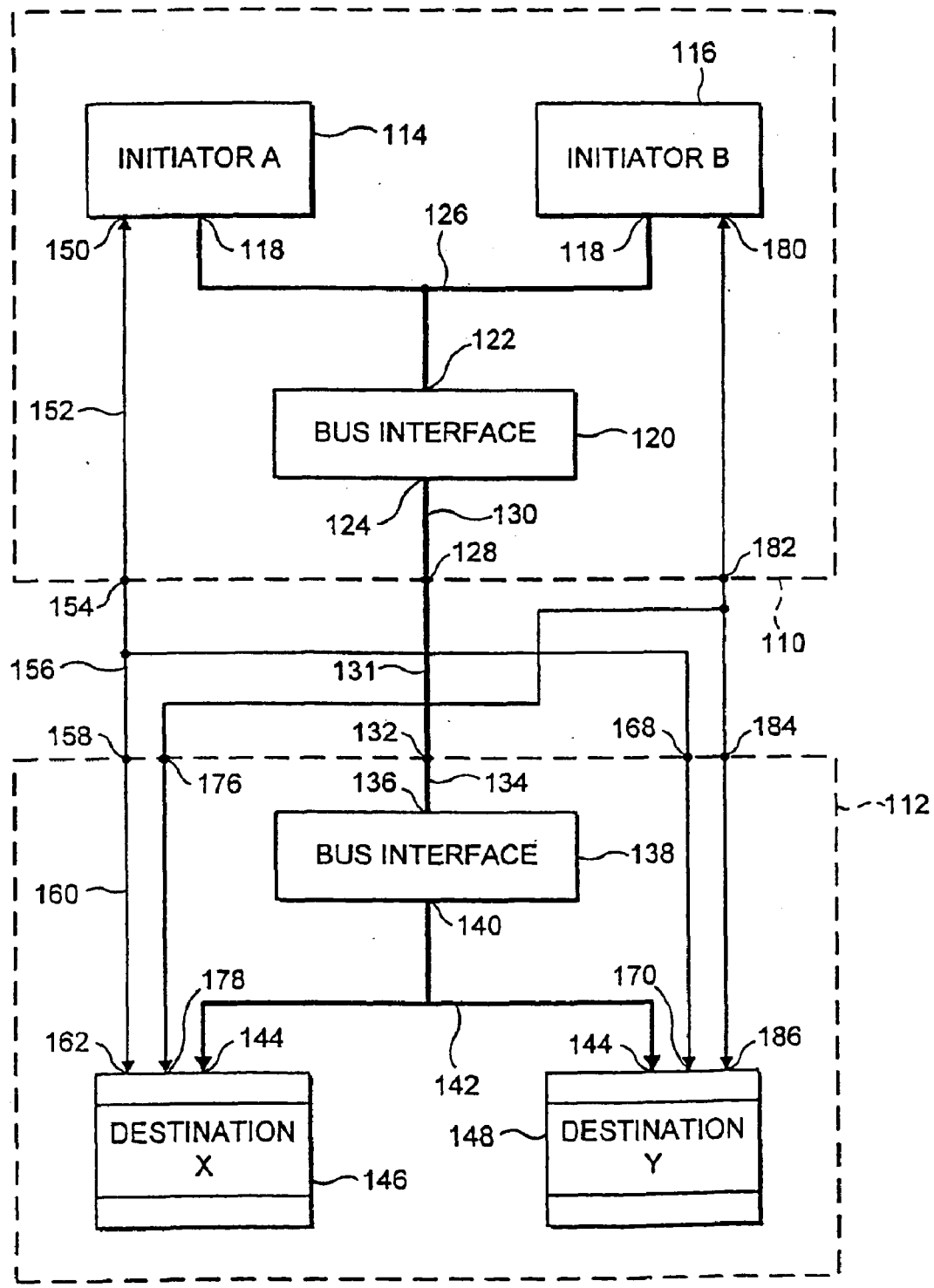
FIGS. 1, 1A and 1B are block diagrams of prior art direct memory access arrangements with a single destination device.
Figure 1A:
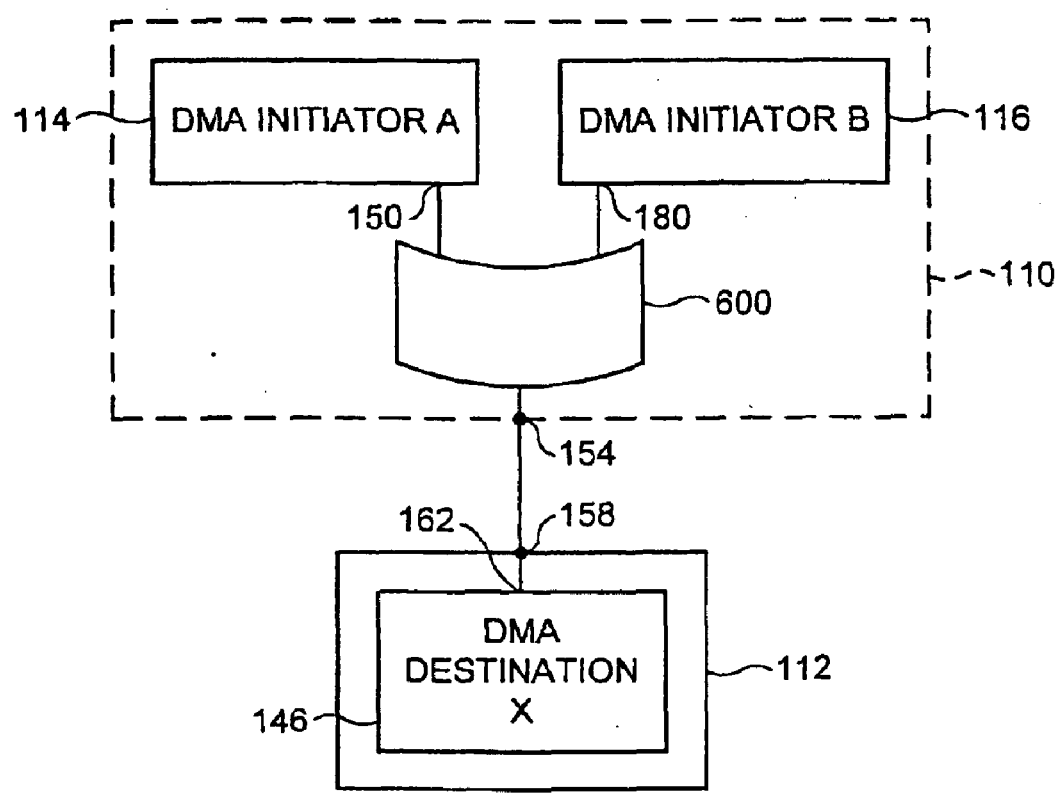
Figure 1B:
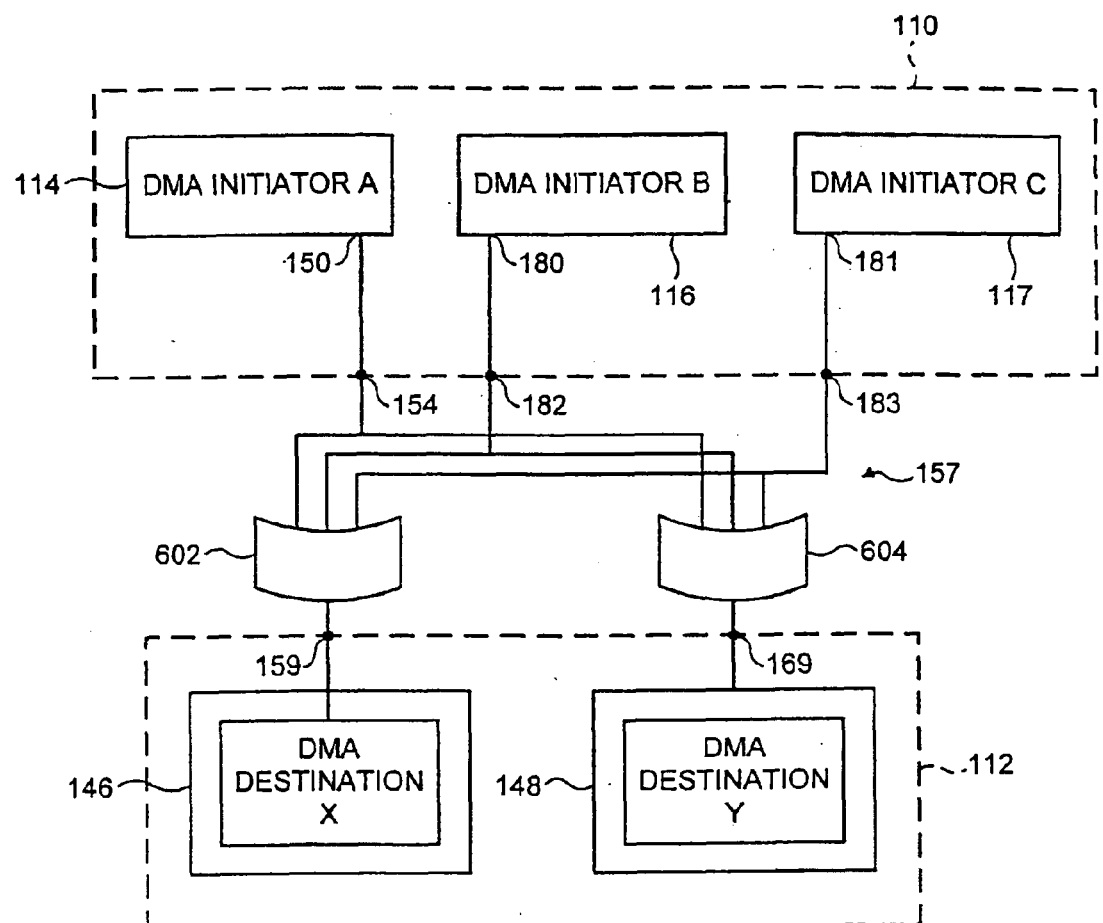
Figure 2:
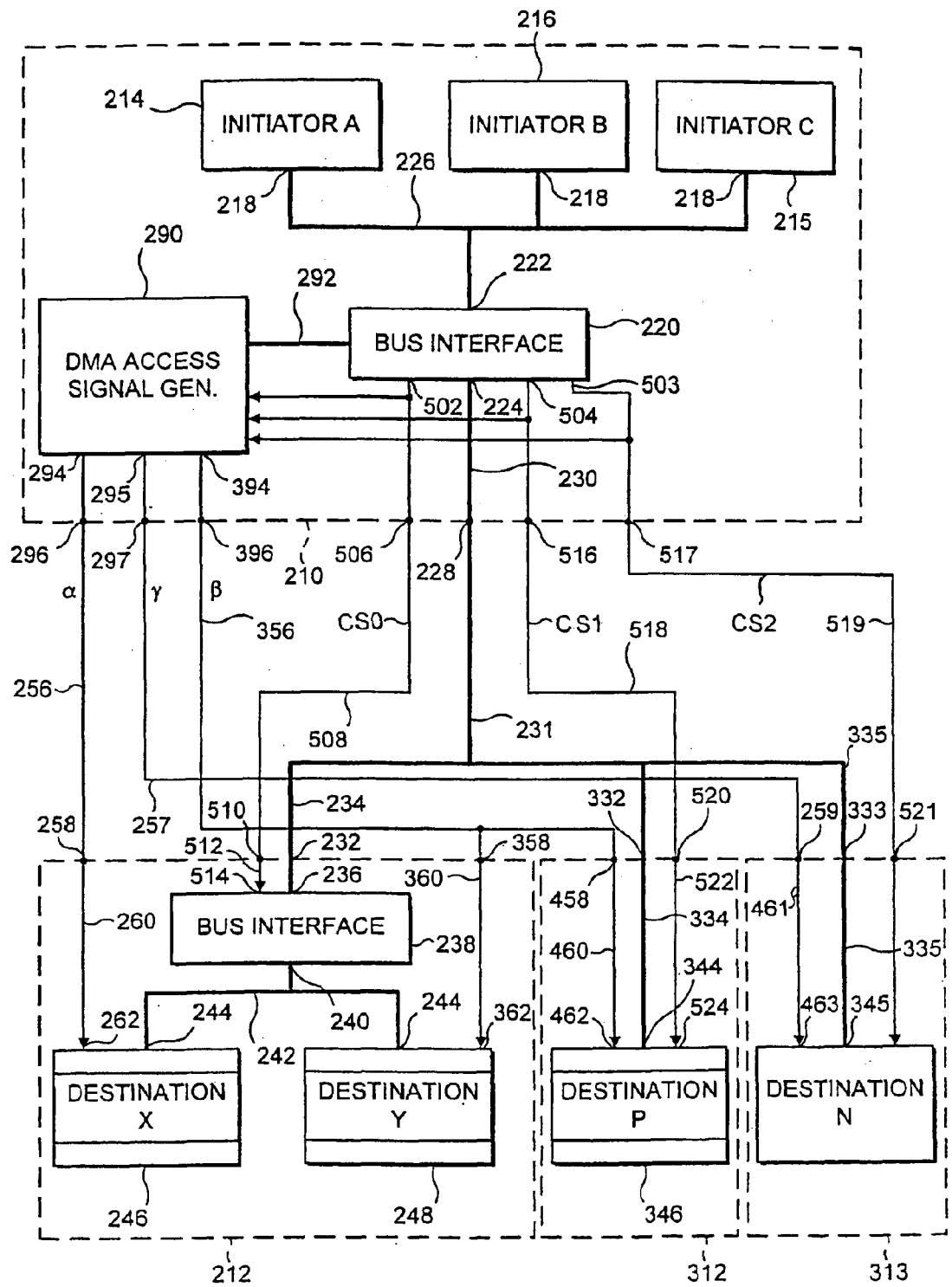
FIG. 2 is a block diagram of a prior art direct memory access arrangement with three destination devices.

A prior art arrangement will now be described with reference to FIG. 2 followed by an arrangement in accordance. with the invention shown in FIG. 3. The arrangement of FIG. 2 includes three initiators on a source chip 210 which can access two memories on a first target chip 212 and a single memory on each of a second and third target chip 312, 313. The source chip 210 has a first source A, 214 and a second source C, 216 and a third source B, 215. Three sources are shown for simplicity, but again there could be six, for example. Each source has a data and address bus output 218. A bus interface 220 is also provided on the source chip and has a bus input 222 and a bus output 224. A data and address bus 226 connects the data and address output 218 of the first source 214, the data and address bus output 218 on the second source 216, and the data and address bus 218 on the third source 215 and the bus input 222 of the bus interface 220. Bus output pins 228 are provided on the chip 210 for external connection to the target chips 212 and 312. The bus output pins 228 are coupled to the bus output 224 of the bus interface 220 by a bus 230.

The first target chip 212 has bus input pins 232 connected by external connections 231 to the bus output pins 228 on the source chip 210. The bus input pins 232 are connected by a bus 234 to the input 236 of a bus interface 238. The bus output 240 of the bus interface 238 is coupled to a bus 242 which is connected to the inputs 244 of each of two targets, namely a target X 246 and a target Y 248. The second target chip 312 has bus input pins 332 connected by the external connections 231 to the bus output pins 228 on the source chip 210. The bus input pins 332 are connected by a bus 334 to the input 344 of a target P referenced 346. The third target chip 313 has bus input pins 333 connected by the external connections 231 to the bus output pins 228 on the source chip 210. The bus input pins 333 are connected by a bus 335 to the input 345 of the destination N 247.

As described above, each target is a port which is coupled to some random access memory (RAM) which may be on the target chip or may be external to it. The target provides a port or channel to the memory and the target port and the memory itself together form a memory circuit. The target may comprise an interface to an external microprocessor, and may include a read-ahead buffer. The bus interfaces 120,138 are described for convenience as having inputs and outputs since they are used in that sense during DMA write access, though in fact their ports may be bidirectional.

When normal write operations are required, the selected source 214, 215 or 216 provides the data and memory address location over the bus 226 to the bus interface 220. This is conveyed by bus 230, pins 228, external connections 231, pins 232, and bus 234 to the bus interface 238 on the first target chip 212. The bus interface 238 then conveys the data and address onto the bus 242 and to the appropriate target 246,248. The bus interface 220 also conveys the address and data by bus 230, pins 228, external connections 231, pins 332, and bus 334, 335 to the targets 346, 347 on the second target chip 312 and third target chip 313. The appropriate associated memory is then written with the data in accordance with the address instruction. This is then repeated for subsequent data words to be written to memory.

For DMA access from the sources 214, 215, 216 to the targets 246, 248, and 326, it is necessary for an indication to be given to the target that DMA access is to take place. In this arrangement, this is achieved by a DMA access signal generator 290 which is coupled to the bus interface 220 by a bus 292. As described below, the DMA access signal generator 290 monitors the bus interface 220 to determine whenever a DMA access is required, whether from source 214, 215 or source 216, and asserts an output whenever this is the case. The DMA access signal generator has three outputs, namely an output α 294, an output β 394 and an output γ 295. The output 294 is connected to a DMA access pin 296 on the chip 210, the output 394 is connected to a DMA access pin 396 on the chip 210 and the output 295 is connected to DMA access pin 297. Each pin has one comparator associated with it in the DMA generator 290, so three sources require the DMA access pins.

The pin 296 is connected by an external connection 256 to a pin 258 on the target chip 212 which is connected by a line 260 to a DMA access signal input 262 on the target 246. When any of the sources 214, 215 or 216 require DMA access to the target 246, the output 294 is enabled and a signal applied to the target 246 to tell it to expect direct memory access to take place. Likewise, the pin 396 is connected by an external connection 356 to a pin 358 on the first target chip 212 which is connected by a line 360 to a DMA access signal input 362 on the target 248. Additionally, however, the pin 396 is connected by the external connection 356 to a pin 458 on the second target chip 312 which is connected by a line 460 to a DMA access signal input 462 on the target 346. When any of the sources 214, 215 or the source 216 requires DMA access to either the target 248 or the target 346, the output 394 is enabled and a signal is applied to the target 248 and to the target 346 indicating that direct memory access is to take place. The third pin 297 is connected to a pin 259 on the third target chip 313 which is connected by a line 461 to a DMA access input 463 on the target 347. When any of the sources requires DMA access to target 347, the output 295 is enabled.

It is also necessary to indicate to the target 248 on the first chip 212 and to the target 346 on the second chip 312 which of them the access is actually intended for. This is achieved by making use of two additional outputs of the bus interface 220. These outputs are two chip select outputs CS0, CS1, namely a first chip select output CS0 502 and a second chip select output CS1 504. The chip select outputs indicate which of the two chips 212 and 312 the source wishes to address. The first chip select output 502 is connected to a pin 506 on source chip 210, through an external connection 508, and then to a pin 510 on the first target chip 212. The pin 510 is connected by a line 512 to an input 514 of the bus interface 238. The second chip select output 504 is connected to a pin 516 on chip 210, through an external connection 518, and then to a pin 520 on the second target chip 312. The pin 520 is connected by a line 522 to an input 524 of the target 346. The chip select outputs 502 and 504 of the bus interface 220 are also each connected to the DMA access signal generator 290. The chip select outputs 502 and 504 and the associated pins 506 and 516 will in general already exist on the chip 210, so their use entails no additional penalty in terms of additional pins on the source chip 210. Similarly, a third chip select output CS2 503 is provided for the third target chip 313.

When a DMA access is required by one of the three sources, one of the three DMA access signal pins 296, 396 and one of the chip select pins 506, 516, 517 will be asserted. If DMA access is required to target 246, then pins 296 and 506 are asserted, if DMA access is required to target 248, then pins 396 and 506 are asserted, if DMA access is required to target 346, then pins 396 and 516 are asserted and if DMA access is required to target 347 then pins 297 and 517 are asserted. Thus three additional pins are required for three sources to have DMA access to any of three targets. The target will ignore the DMA access signal unless it is accompanied by a valid chip select signal. In the previously proposed DMA access signal generator 290 described each initiator can be associated with any pin, but each pin can only be associated with one initiator, i.e. the initiator to pin relationship is one to many, but not many to one. In the example given, the DMA output indication can be summarized by the following table, table 1 which is a combination of the DMA access generator and the external connections.

TABLE 1

| Source | Output | Destination |
|--------|--------|-------------|
| A      | α      | X           |
| B      | β      | Y, P        |
| C      | γ      | N           |

Other combinations would be possible by changing the mappings in the DMA access generator, or changing the external connections. The DMA access generator operates by comparing the initiator IO on the bus interface to determine whether DMA access is required and, if so, asserts the appropriate output. In whatever combinations are made, with 3 initiators, 3 pins are required, or generally with N initiators, N pins are required.

Figure 3:
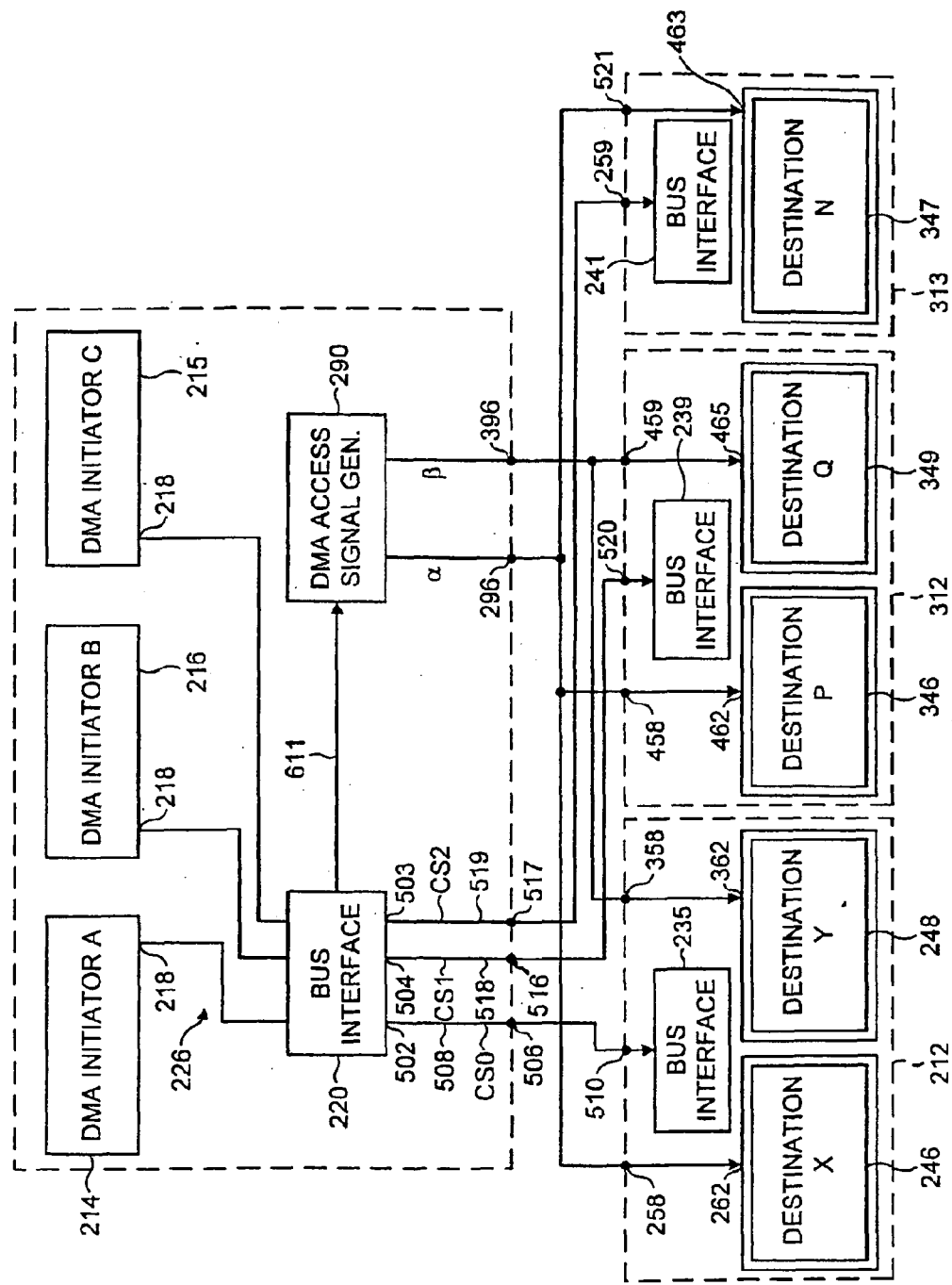
FIG. 3 is a block diagram of a direct memory access arrangement incorporating an integrated circuit according to the invention.

An embodiment of the invention is shown in FIG. 3 and will now be described. For simplicity, only the components pertinent to DMA access will be described, but it will be appreciated that a data bus will also be provided, as shown in FIG. 2. In the embodiment there are three DMA initiators, labelled A214, B216 and C215 as before, which have DMA outputs 218 which are provided as connections 226 to bus interface 220. The bus interface 220 determines which chip is selected and provides outputs 502, 504, 503 to lines 508, 518, 519 which are connected each to a respective one of three destination chips. A first chip select signal CS0 is provided via pin 506 to pin 510 on a first chip 212, a second chip select signal CS1 is provided via pin 516 to pin 520 on a second chip 312 and a third chip select signal is provided via pin 517 to pin 259 on a third chip 313. The respective bus interface 238, 239, 241 receives the respective chip select signal and is switched to receive data over a data bus (not shown for simplicity).

If any of the initiators A, B or C require DMA access to any one of the destinations, then the respective ID of the initiator requiring DMA access is provided to the DMA access signal generator 290 over line 611. The DMA access signal generator then conducts multiple comparisons of the initiator IDs, and asserts a DMA access signal α or β to pins 296, 396 as appropriate. Note that even though there are three initiators, only two pins are required because of the multiple comparisons within the DMA signal generator.

If DMA access is required to destination X, then the DMA access generator asserts signal α via pin 296 to pin 258 on target chip 212 which provides an input 262 to destination X. Note that inputs 462 of destination P and input 463 of destination N are also asserted, but that chip select signal CS0 identifies that it is target 212 to which data is written, not 312 or 313. On the other hand, if DMA access is required to destination Y, then DMA access signal β is asserted via pin 396 to pin 459 providing input 362 to destination Y. Again chip select CS0 identifies the first target chip 212 even though the DMA access signal is also provided to destinations Q as well.

In a similar fashion destinations P and Q are selected by asserting either signal α or β over pins 296, 396 to pins 458, 459 and inputs 462, 465 to destinations P and Q. Simultaneously, chip select CS1 is asserted over lines 518 and pins 516, 520. Lastly, destination N is selected by asserting DMA access α over pins 296 to pin 521 and chip select CS2.

The general case can now be understood that there are as many DMA access pins as there are the maximum number of destinations within any target chip. In this case, there are two destinations maximum per chip. The relevant destination is selected by a combination of the already provided chip select and the DMA access generator. The following table, Table 2, summarizes the access arrangement specified by the DMA access signals:

TABLE 2

| Source | Output | Destination |
| --- | --- | --- |
| A | α | X, P, N |
|  | β | Y, Q |
| B | β | Y, Q |
| C | α | X, P, N |

Note, however, that the usual chip select signal is also present when accessing a destination so that source A would usually only talk to destinations X and Q for example, by specifying chip select CS0 or CS1. Similarly, source C would not usually talk with destinations Y and P, and would access destination N only by specifying chip select CS3. This is shown by the expanded table, Table 3, which shows how the DMA access signal operates in conjunction with the chip select signal.

TABLE 3

| Source | Output | Possible Destination | Chip Select | Destination |
| --- | --- | --- | --- | --- |
| A | α | X, P, N | CS0 | X |
|  | α | X, P, N | CS1 | P |
|  | β | Q, Y | CS1 | Q |
| B | β | Y, Q | CS0 | Y |
| C | α | X, P, N | CS2 | N |

The ability to take three initiators and provide DMA access using only two DMA pins is a result of multiple comparisons within the DMA access signal generator 290, thereby providing a many to one or more relationship between initiators and pins. As an example, both initiators A and B use DMA pin β 396, as shown in Table 3. Similarly, both initiators A and C use DMA pin α 296. The general case is that the DMA access generator receives DMA access signals from multiple sources and provides DMA outputs to fewer pins than sources by a comparison arrangement which maps more than one source to any given pin. Used in conjunction with the already present chip select signal, desired destinations for DMA access are uniquely specified.

The arrangement described is flexible as it can be varied relatively easily to accommodate different numbers of sources and targets. Most sources will, in fact, either always request normal memory access or always request DMA access. Thus the source identification (ID) itself indicates whether a DMA access is required or not. The DMA access signal generator monitors the bus interface to detect when a DMA access requiring source requests a memory access, and in response to this source identification asserts a DMA access signal output. For those components which can request either normal access or DMA access, such as a microprocessor, two source identifications are allocated for the normal and DMA access mode respectively.

Figure 4:
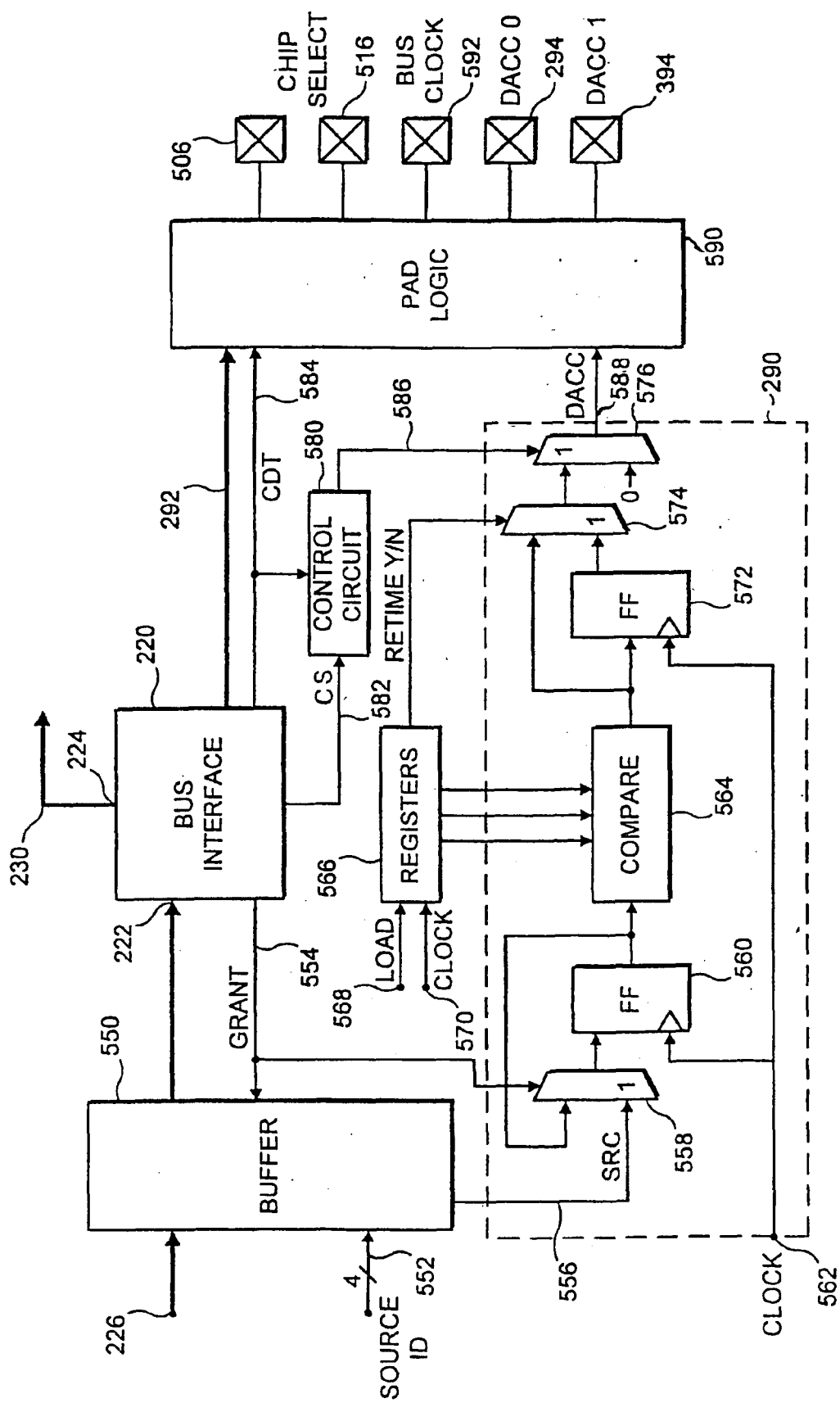
FIG. 4 is a block diagram of the direct access signal generator used in the arrangement of FIG. 3.

FIG. 4 shows the construction of the DMA access signal generator 290 of FIG. 3 and its connection to the surrounding elements. FIG. 4 shows the DMA access signal generator 290 for one of the DMA access signal outputs 294. The circuit is repeated for the other DMA access signal output 394. Shown in FIG. 4 is a buffer circuit 550 which is coupled at the input 222 of the bus interface 220 and which is in turn connected to the bus 226. The buffer circuit 550 is not shown in the previous figures for simplicity and clarity, and it will be well understood by those skilled in the art that circuits such as the buffer circuit 550 are included in a practical embodiment of the arrangement shown in FIG. 3. The buffer circuit 550 receives address and data over the bus 226 and also receives the identification of the source making the request over a line 552. The bus interface provides an enabling or bus grant signal over a line 554 which indicates when the buffer 550 is to provide an output to the bus interface 220 and then to the bus output 224 and bus 230. The bus grant signal is asserted regardless of whether it is a normal access or a DMA access that is required.

When enabled by a grant signal on line 554, the buffer circuit 550 also outputs the source identification on a line 556 to a selector 558. The selector 558 is controlled by the grant signal on line 554 and provides an output to a flip-flop circuit 560 which serves as a hold circuit. If the grant signal is present, then this indicates that a new source identification may have been received. If the grant signal is not present, then the selector 558 recirculates the output of flip-flop 560 back to its input. The flip-flop 560 receives a clock signal 562 synchronized with the clock in the bus interface 220.

The source identification which is thus held in the flip-flop 560 is then applied to a comparator 564. The comparator 564 compares the source identification with one of several source identifications held in registers 566. The registers 566 hold the identifications of the sources which require DMA accesses. These identifications are loaded at startup of the system via a load input 568 under control of a system clock 570. Whenever the incoming source identification matches one of the source IDs held in the registers 566, the comparator 564 provides an output. This output is applied both directly and through a flip-flop 572 to a selector 574. The selector 574 is controlled from the registers 566 and, when required, includes the flip-flop 572 in the signal path, for retiming purposes. If re-timing is not required the direct path is selected by the selector.

The output of the selector 574 is applied to one input of a selector 576, the other input of which is held at zero level. The control for selector 576 is via a control circuit 580 which receives two signals from the bus interface circuit 220, namely a chip select (CS) signal on line 582 and a current device type (CDT) signal on line 584. The control circuit 580 combines these two inputs by logically ADDing them to provide a signal on line 586 to the selector 576. The purpose of this is so that the DMA access signal (DACC) is only asserted when the chip select signal is present. The DMA access signal is then applied from the selector 576 via a line 588 to padlogic 590 which supplies outputs to the chip select pins 506 and 516, to the DMA access (DACC) pins 294 and 394, and to a bus clock pin 592. In practice the DACC signal may be further retimed by the clock 562.

It will be appreciated that many modifications may be made to the embodiments illustrated within the scope of the appended claims.

That which is claimed is:

1. A semiconductor integrated circuit arrangement for use in Direct Memory Access (DMA), comprising:
    a plurality of target devices, at least some of said target devices having a plurality of destinations;
    a plurality of initiators on a source device for initiating DMA access to one or more destinations on said target devices;
    a DMA access signal generator on the source device arranged to receive an identification from each of the plurality of initiators when DMA access is initiated by a respective initiator; and
    a plurality of DMA output pins on the source device, wherein there are fewer DMA output pins than initiators;
    the DMA access signal generator outputs a DMA access signal to one of the DMA output pins when an identification is received from any one of the plurality of initiators.

2. A semiconductor integrated circuit arrangement according to claim 1, wherein the DMA access signal generator maps at least some initiators to DMA output pins in a many to many relationship.

3. A semiconductor integrated circuit arrangement according to claim 1, wherein the DMA access signal generator stores multiple initiator identifications for each DMA output pin and conducts multiple comparisons between received and stored identifications.

4. A semiconductor integrated circuit arrangement according to claim 1, further comprising external connections for connecting the plurality of DMA output pins to input pins on the target device.

5. A semiconductor integrated circuit arrangement according to claim 4, wherein each of the external connections connects one DMA output pin to one destination on each of the target devices.

6. A semiconductor integrated circuit arrangement according to claim 5, wherein the number of DMA output pins is the same as a maximum number of destinations on a target device.

7. A semiconductor integrated circuit arrangement according to claim 1, wherein the source device further comprises a plurality of chip select pins.

8. A semiconductor integrated circuit arrangement according to claim 7, wherein each chip select pin is connected to a respective one of the plurality of target devices.

9. An integrated circuit comprising:
    a plurality of target devices, at least some of said target devices having a plurality of destinations;
    a plurality of initiators for initiating Direct Memory Access (DMA) to one or more destinations on said target devices;
    a DMA signal generator to receive an identification from a respective initiator when DMA is initiated by the respective initiator, and to output a DMA signal; and
    a plurality of DMA output pins to respectively receive the DMA signal when an identification is received at the DMA signal generator from one of the plurality of initiators, wherein there are fewer DMA output pins than initiators.

10. An integrated circuit according to claim 9, wherein the DMA signal generator maps at least some initiators to DMA output pins in a many to many relationship.

11. An integrated circuit according to claim 9, wherein the DMA signal generator stores multiple initiator identifications for each DMA output pin and conducts multiple comparisons between received and stored identifications.

12. An integrated circuit according to claim 9, further comprising external connections for connecting the plurality of DMA output pins to input pins on the plurality of target devices.

13. An integrated circuit according to claim 12, wherein each of the external connections connects one DMA output pin to one destination on each of the target devices.

14. An integrated circuit according to claim 13, wherein the number of DMA output pins is the same as a maximum number of destinations on one target device.

15. An integrated circuit according to claim 9, further comprising:
    a bus interface connecting the initiators with the DMA signal generator; and
    a plurality of chip select pins connected to the bus interface.

16. An integrated circuit according to claim 15, wherein each chip select pin is connected to a respective one of the plurality of target devices.

17. A method of controlling Direct Memory Access (DMA) in an integrated circuit comprising:
    initiating DMA with a plurality of initiators to one or more destinations on a plurality of target devices;
    connecting the plurality of initiators to a DMA signal generator via a bus interface;
    connecting a plurality of chip select pins to the bus interface;
    using the DMA signal generator for generating a DMA signal based upon an identification from a respective; and
    providing a plurality of DMA output pins to respectively receive the DMA signal, wherein there are fewer DMA output pins than initiators.

18. A method according to claim 17, wherein at least some initiators are mapped to DMA output pins in a many to many relationship.

19. A method according to claim 17, wherein a DMA signal generator generates the DMA signal, stores multiple initiator identifications for each DMA output pin and conducts multiple comparisons between received and stored identifications.

20. A method according to claim 17, further comprising connecting each chip select pin to a respective one of the plurality of target devices.

21. A method according to claim 17, further comprising connecting the plurality of DMA output pins to input pins on the plurality of target devices.

22. A method according to claim 21, wherein one DMA output pin is connected to one destination on each of the target devices.

23. A method according to claim 22, wherein the number of DMA output pins is the same as a maximum number of destinations on one target device.

* * * * *